United States Patent [19]

Lung

[11] Patent Number: 5,489,776
[45] Date of Patent: Feb. 6, 1996

[54] MICROBOLOMETER UNIT CELL SIGNAL PROCESSING CIRCUIT

[75] Inventor: Gerald Lung, Los Angeles, Calif.

[73] Assignee: Hughes Aircraft Company, Los Angeles, Calif.

[21] Appl. No.: 297,733

[22] Filed: Aug. 30, 1994

[51] Int. Cl.$^6$ ................................. G01J 5/20; G01J 5/22
[52] U.S. Cl. .................. 250/332; 250/338.4; 250/370.08
[58] Field of Search ................................. 250/332, 338.1, 250/338.4, 370.08, 351

[56] References Cited

U.S. PATENT DOCUMENTS

| | | | |
|---|---|---|---|
| 4,795,904 | 1/1989 | Richards | 250/332 |
| 4,902,895 | 2/1990 | Hanson | 250/338.4 X |
| 5,021,663 | 6/1991 | Hornbeck | 250/338.1 X |
| 5,196,703 | 3/1993 | Keenan | 250/332 |
| 5,286,976 | 2/1994 | Cole | 250/338.4 X |
| 5,369,280 | 11/1994 | Liddiard | 250/338.4 X |

OTHER PUBLICATIONS

Bonnsegni et al., "Low Temperature Bolometer Array", Rev. Sci. Instrum., vol. 60, No. 4, 1989, pp. 661, 663–665.

Primary Examiner—Carolyn E. Fields
Assistant Examiner—Edward J. Glick
Attorney, Agent, or Firm—M. W. Sales; W. K. Denson-Low

[57] ABSTRACT

A circuit (30) for processing a signal provided by a silicon microbolometer unit cell (76). In accordance with the invention, electrical energy is applied to a first terminal of the unit cell (76) to generate first and second signals at the first terminal thereof during first and second time intervals or fields, respectively. These signals are sampled and subtracted from each other by a sampling capacitor (80) to provide a third signal which is directly proportional to a difference between the first signal and the second sampled signal. In a specific embodiment, the difference signal is amplified to provide the desired output signal. The inventive circuit provides coarse DC offset non-uniformity correction and sets the overall gain of a focal plane array of silicon microbolometer unit cell detectors. This allows for use of a simplified analog signal processing circuit.

9 Claims, 4 Drawing Sheets

MICROBOLOMETER UNIT CELL SIGNAL PROCESSING CIRCUIT

BACKGROUND OF THE INVENTION

1. Field of the Invention

The present invention relates to electromagnetic sensors. More specifically, the present invention relates to silicon microbolometers designed to sense infrared energy.

2. Description of the Related Art

Night vision systems are well known in the art. Night vision systems typically include a cryogenically cooled linear detector array with an associated cryogenic subsystem, a scanning system which moves the array across a two-dimensional field, and a diffractive optical system which focuses energy onto the detector. The detectors in the array either sense the heat of a body or detect low light levels.

While these systems have been used for military applications, the high cost of the scanning, cooling and optical systems associated therewith has heretofore limited the applicability of same for numerous other applications. U.S. patent application Ser. No. 08/232,893, filed Apr. 12, 1994, by S. H. Klapper et al., the teachings of which are incorporated herein by reference, discloses and claims a low cost camera for night vision systems including a focal plane array (FPA) of uncooled detectors and an optically fast, optical arrangement for focusing energy from an input aperture onto the array. The array includes a plurality of pyroelectric detectors which, in the illustrative embodiment, are fabricated of barium-strontium-titanate (BST) material.

While this system provides an inexpensive night vision system with good performance characteristics, there are a few areas in which the system may be further improved.

Firstly, the detector array of the above-described system requires a motor driven chopper wheel in front of the detector. The chopper wheel facilitates the sequential readout of the array and aids in the establishment of a DC reference level which is representative of the average DC level of the scene. Unfortunately, the chopper wheel and motor are expensive and fragile. In addition, the chopper wheel must be optically aligned and mechanically synchronized with the frame rate of the array.

Secondly, the barium-strontium-titanate detector requires temperature stabilization around a fixed reference point. Temperature stabilization consumes much power, requires recalibration and is tough to maintain in extreme environments.

Thirdly, the barium-strontium-titanate detector requires detector hybridization to the silicon readout chip. That is, the detector is of a different material composition than that of the silicon readout chip. The two types of material must be separately grown. This dictates that the two materials cannot be fabricated in the same facility and cannot be tested at the same test site. Each requires different plumbing, gas chamber, probe material and etc. An elaborate bump structure must be grown on the detector and the readout chip as the two chips are indium bump squeezed together. If the detector and the readout chip are not properly sandwiched together, the device will not work despite the fact that the detector and the chip were satisfactorily tested individually. Thus, the manufacturing yield is quite low. In addition, since the detector is opaque, there is no way of aligning it against the silicon. As a result, the hybrid detector requires much "hands on" fabrication. In short, the hybrid detector is costly to manufacture.

Fourthly, the BST detector is an inert ceramic material which does not react well to chemical etchants. Hence, a laser must be used to cut the detector elements. This creates a waffle construction. If the grooves between the detectors are not cut properly, cross-talk between detector elements results. Proper cutting with the laser creates small air gaps between the pixels. This leaves material of only 5–10 microns in thickness to hold the detector array together. This creates an extremely fragile construction which must endure the sandwiching operation described above. In addition, thermal isolation across the small junctions is imperfect. This creates a thermal bleedthrough or cross-talk which results in an electrical cross-talk.

Thus, other detector technologies have been considered. One alternative is to use a silicon microbolometer. A silicon microbolometer is a family of uncooled detector which sense heat based on a different principle than BST detectors. Unfortunately, although silicon microbolometers address many of the problems besetting BST detectors, in large uncooled focal plane arrays, silicon microbolometers suffer from excessive pixel to pixel nonuniformities due to the maturity of the detector process and large pedestals caused by the detector pulse bias mechanism. The nonuniformities are typically on the order of 5–10 times greater than the nonuniformities associated with BST detectors. This typically reduces the dynamic range available for the signal processing electronics. This has necessitated complex, high resolution, high performance, high cost, low yield signal processing electronics. Hence, the DC nonuniformities have heretofore eliminated silicon microbolometers from consideration for certain applications.

Thus, a need exists in the art for a system and technique for eliminating excessive pixel to pixel nonuniformity in large arrays of silicon microbolometer detectors.

SUMMARY OF THE INVENTION

The need in the art is addressed by the present invention which provides a circuit for processing a signal provided by a silicon microbolometer unit cell. In accordance with the invention, electrical energy is applied to a first terminal of the unit cell to generate first and second signals at the first terminal thereof during first and second time intervals or fields. These signals are sampled and subtracted from each other to provide a third signal which is equal to the difference between the first signal and the second sampled signal. In a specific embodiment, the difference signal is amplified to provide the desired output signal.

The inventive circuit provides coarse non-uniformity correction and sets the overall gain of a focal plane array of silicon microbolometer unit cell detectors. This allows for a simplified analog signal processing circuit to be used with the array.

BRIEF DESCRIPTION OF THE DRAWINGS

FIG. 4 is a detailed schematic diagram of the circuit of FIG. 2.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
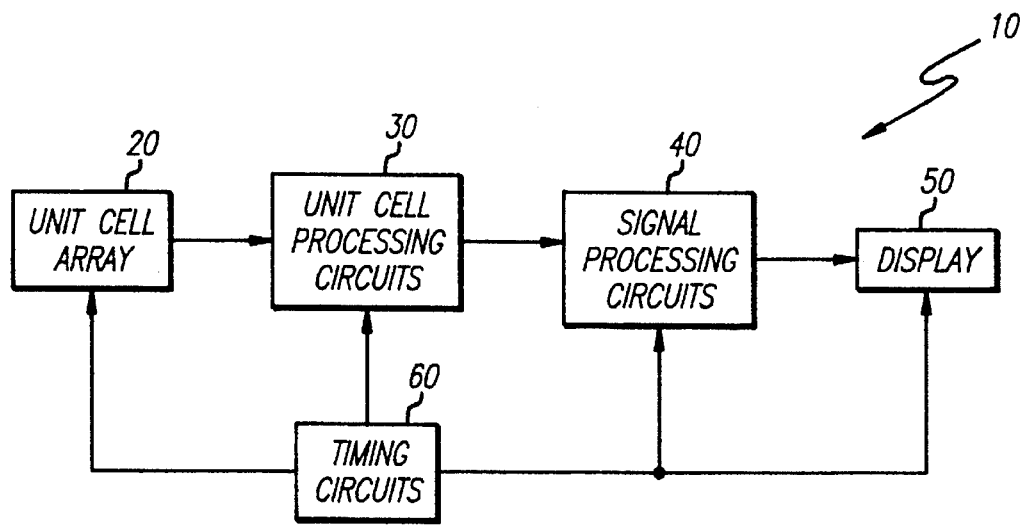
FIG. 1 is a block diagram of an imaging system utilizing a silicon microbolometer camera constructed in accordance with the present teachings.

FIG. 1 is a block diagram of an imaging system utilizing a silicon microbolometer camera constructed in accordance with the present teachings. As shown in FIG. 1, the imaging system 10 includes a conventional array of uncooled silicon microbolometer unit cells 20. In the illustrative embodiment, the array of unit cells 20 are arranged in a 240 row by 320 column matrix. A plurality of unit cell processing circuits 30 are provided, one for each unit cell in the array 20, to develop unit cell output signals with minimal nonuniformities as discussed more fully below. The signals developed by the unit cell processing circuits are further conditioned by conventional analog and digital signal processing circuits to provide signals suitable for a display 50. The operation of the imaging system 10 is controlled by conventional timing circuits 60.

Figure 2A:
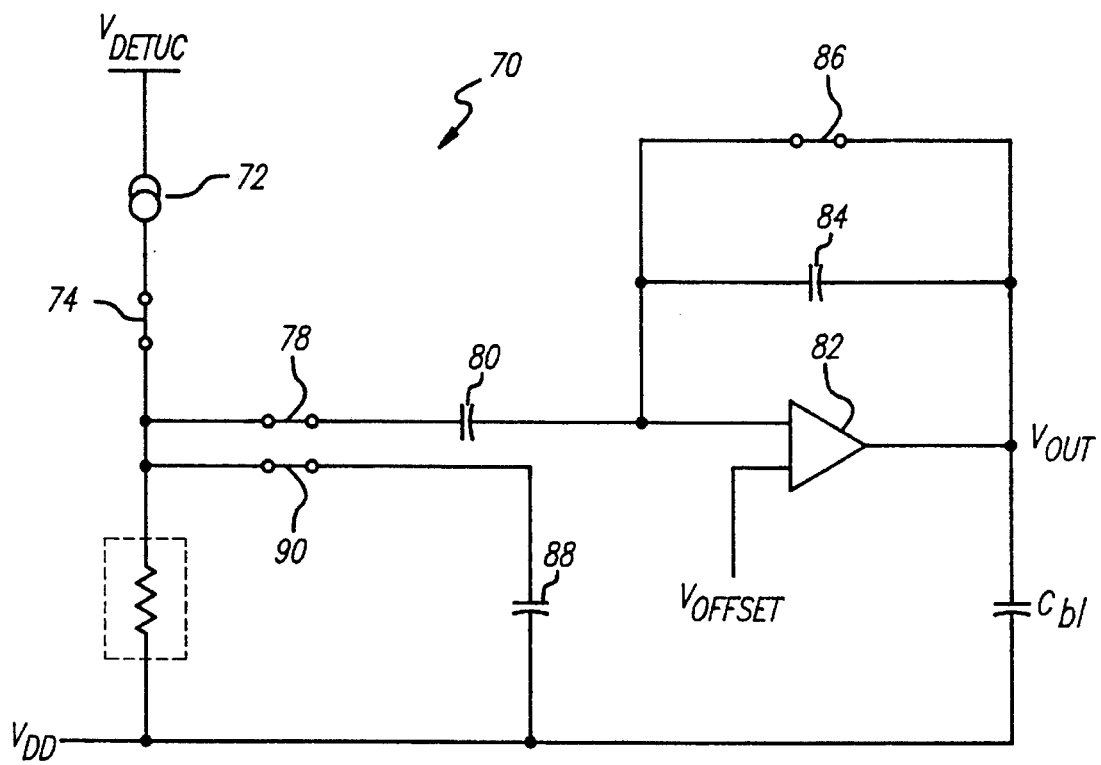
FIG. 2A is an equivalent circuit diagram of the circuit of FIG. 2 during a first (sample) state.
Figure 2B:
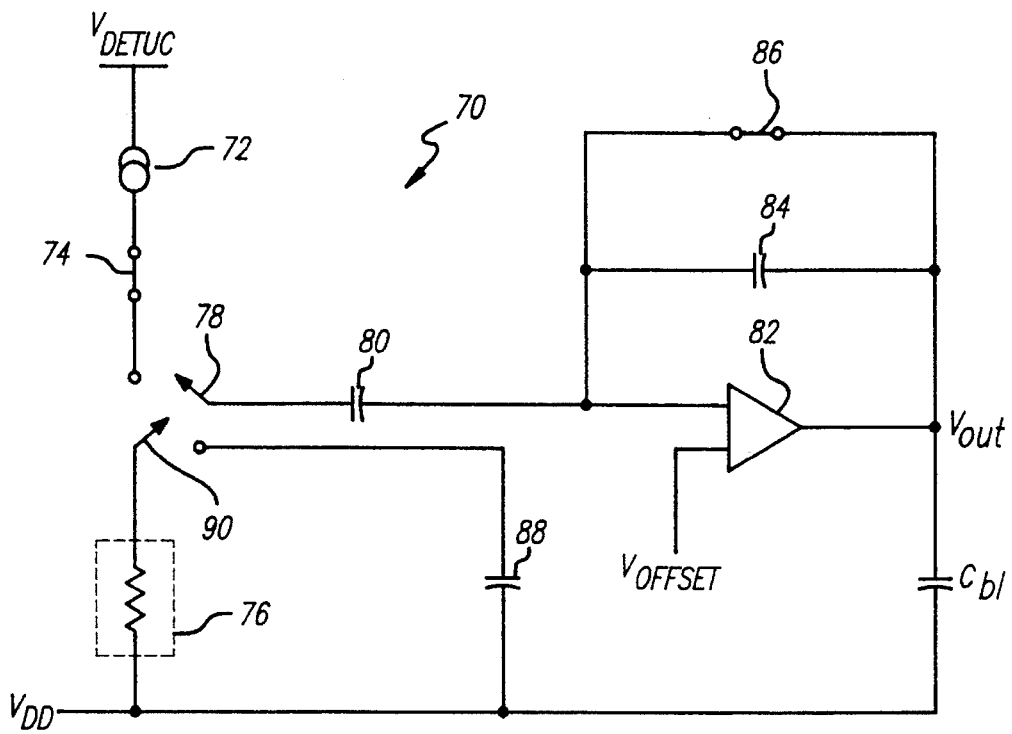
FIG. 2B is an equivalent circuit diagram of the circuit of FIG. 2 during a second (hold) state.
Figure 2C:
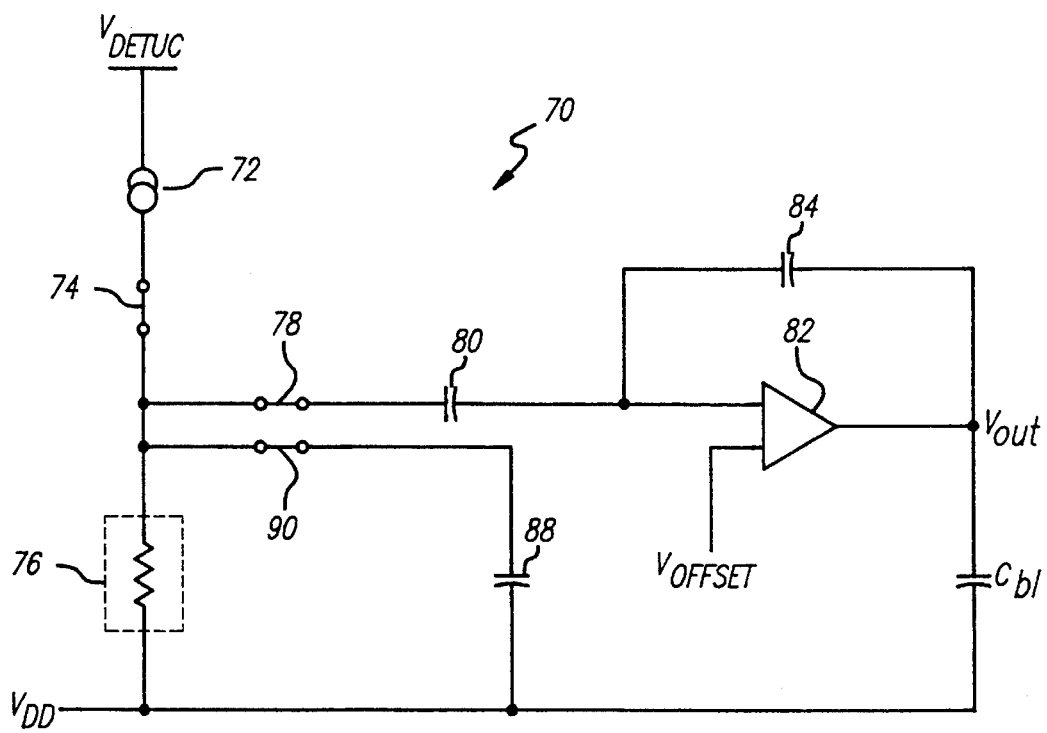
FIG. 2C is an equivalent circuit diagram of the circuit of FIG. 2 during a third (acquisition) state.
Figure 2:
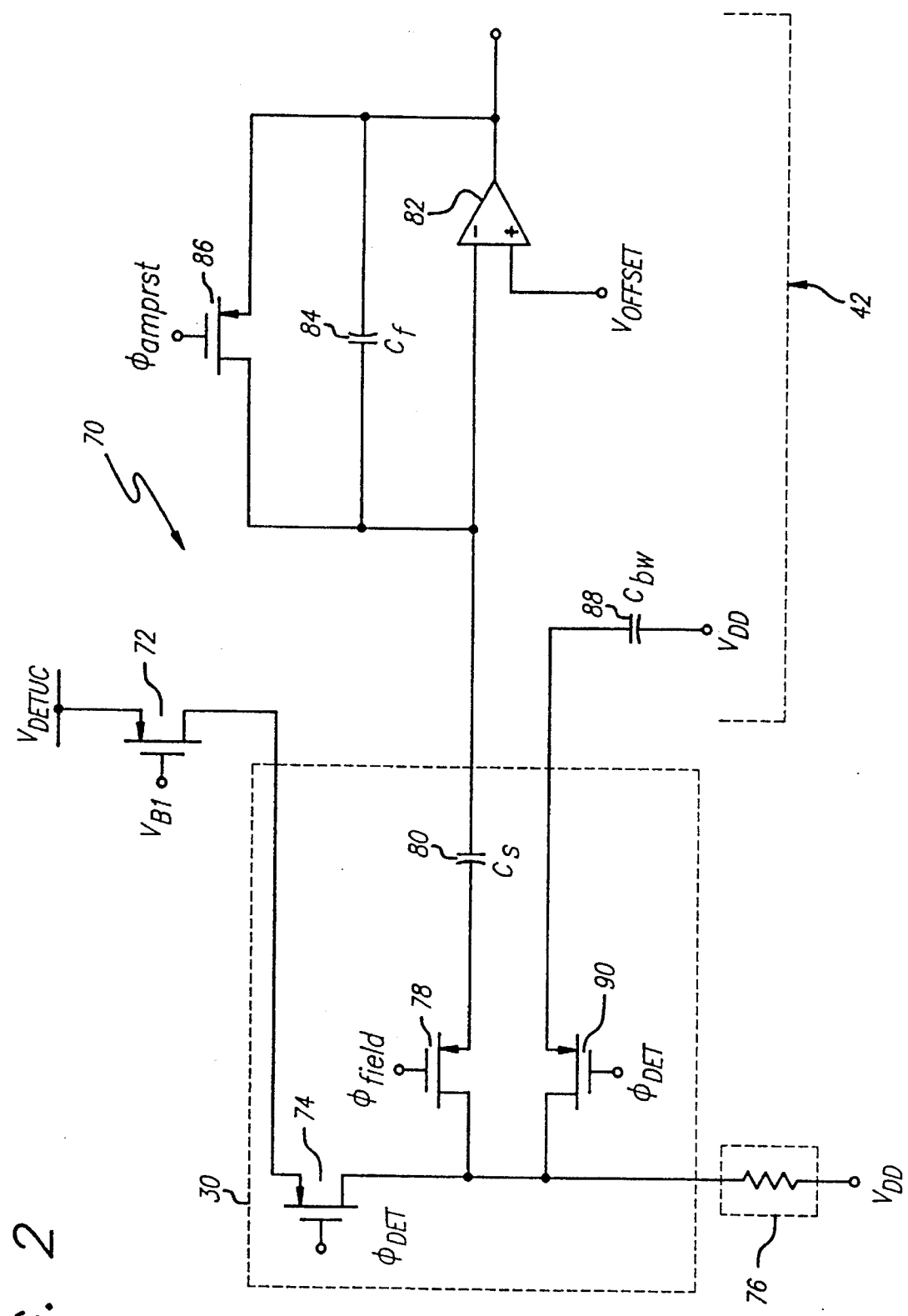
FIG. 2 is a schematic diagram of an illustrative circuit for processing signals provided by a silicon microbolometer unit cell constructed in accordance with the teachings of the present invention.

FIG. 2 is a schematic diagram of an illustrative circuit for processing signals provided by a silicon microbolometer unit cell constructed in accordance with the teachings of the present invention. The circuit 70 includes a circuit 42 associated with a column of unit cells and unit cell circuits. The column circuit 42 includes a current source implemented with a first P-channel metal-oxide semiconductor (MOSFET) transistor 72. The source of the transistor 72 is connected to a source of reference potential $V_{DETUC}$. A gate bias $V_{B1}$ is applied to the gate of the transistor 72. The drain of each of the first P-channel transistor 72 is connected to each unit cell circuit 30 in the column of unit cell circuits.

In accordance with the present teachings, each unit cell circuit 30 includes a second P-channel MOSFET transistor 74 which serves to enable bias current by selectively connecting the current source 72 to a particular silicon microbolometer unit cell detector element or bolomoter 76 of conventional design. The drain of the first P-channel transistor 72 of the current source is connected to the source of the second P-channel MOSFET transistor 74. The gate of the second P-channel MOSFET transistor 74 is driven by a clock signal $\phi_{DET}$ provided by the timing circuits 60 of FIG. 1. The drain of the second P-channel MOSFET transistor 74 is connected to a first terminal of the unit cell 76 at node 1. The second terminal of the unit cell 76 is connected to a second source of reference potential $V_{DD}$.

As discussed more fully below, when the first and second P-channel MOSFET transistors 72 and 74 are activated, current is supplied to the unit cell detector element or bolometer 76. During each field, the voltage developed across the unit cell 76 is sampled by a third P-channel MOSFET transistor 78 and applied to the cathode of a first capacitor ($C_s$) 80 at node 2. The third P-channel MOSFET transistor 78 has its drain connected to node 1 and its source connected to node 2. The gate of the third P-channel MOSFET transistor 78 is driven by $\phi_{field}$, supplied by the timing circuits 60 of FIG. 1.

For a defined system with a specific field period $T_{fi}$ and frame period $T_{fr}$ (where the two field periods equal one frame), during successive fields, the first capacitor 80 blocks the direct current (DC) and effectively remove pixel to pixel nonuniformities and pass a signal on to the inverting input of a differential input operational amplifier 82 which represents the difference between the two fields. One amplifier 82 is provided for each column of unit cell circuits 30. The noninverting input to the operational amplifier 82 is connected to a source of reference potential $V_{OFFSET}$. A second capacitor ($C_f$) 84 is connected across the inverting input and the output terminals of the operational amplifier 82 in a feedback configuration. Thus, as will be appreciated by those skilled in the art, the magnitude of the gain of the amplifier stage will be $C_s/C_f$. The amplifier 82 is reset by a third switch 86 connected across the inverting input terminal and the output terminal thereof. The reset switch 86 is implemented with a fourth P-channel MOSFET transistor. The drain of the fourth P-channel MOSFET transistor is connected to the inverting input terminal of the amplifier 82 and the source of the fourth P-channel MOSFET transistor is connected to the output terminal of the amplifier 82. The gate of the fourth P-channel MOSFET transistor 86 is driven by a clock signal $\phi_{amprst}$ provided by the timing circuits 60.

The current source 72, amplifier 82, feedback capacitor 84 and reset switch 86 comprise part of the signal processing circuitry 40 of FIG. 1 along with a noise limiting third capacitor ($C_{bw}$) 88. The third capacitor 88 is connected to $V_{DD}$ on one end and to a fourth switch implemented with a fifth P-channel transistor 90. The source terminal of the fifth P-channel transistor 90 is connected to the second end of the third capacitor 88 and the drain terminal thereof is connected to node 1. The gate terminal of the fifth P-channel transistor 90 is driven by $\phi_{DET}$.

The components of FIG. 2 are sized to fit the space requirements of the application. For example, in the illustrative embodiment, the components were sized to fit a 50 micrometer by 50 micrometer form factor.

The operation o the inventive circuit of FIG. 2 is illustrated by FIGS. 2A–2C. FIG. 2A is an equivalent circuit diagram of the circuit of FIG. 2 during a first (sample) state. The capacitor $C_{bl}$ is internal to the amplifier 82.

FIG. 2B is an equivalent circuit diagram of the circuit of FIG. 2 during a second (hold) state.

FIG. 2C is an equivalent circuit diagram of the circuit of FIG. 2 during a third (acquisition) state.

Figure 3:
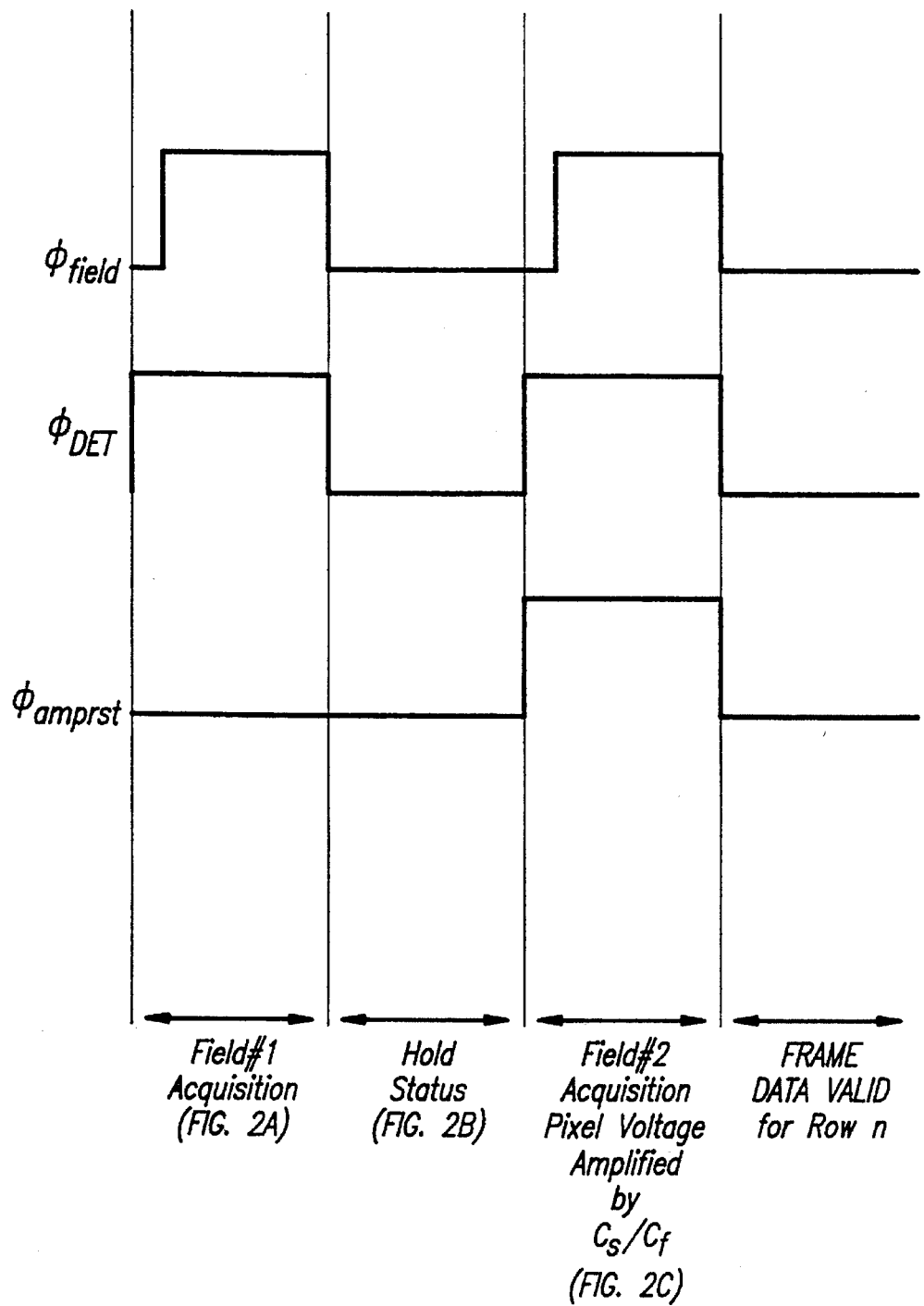
FIG. 3 is a timing diagram illustrative of the operation of the circuit of FIG. 2.

FIG. 3 is a timing diagram illustrative of the operation of the circuit of FIG. 2. Signal states are depicted in the timing diagram of FIG. 3.

As mentioned above, during successive fields, the first capacitor 80 blocks the direct current (DC) and effectively remove pixel to pixel nonuniformities. This is illustrated in FIGS. 2A–2C. During the first state, shown in FIG. 2A, the transistors are activated and shown as short circuits. The amplifier 82 is reset and ready for a new value. During this state, the first field state, the microbolometer 76 is pulsed with the bias current and the resultant voltage is sampled onto node 1. Node 2 remains constant at $V_{offset}$ (user defined) since it is a virtual ground of the column amplifier.

During the second state, illustrated in FIG. 2B, the first, second and fourth switches are opened and the circuit is in a hold state. Thus, during the first and second states, the voltage at node 1, $V_1$, equals $V_{field1}$ the sampled voltage, the voltage at node 2, $V_2$ is $V_{offset}$ and the amplifier output voltage $V_{out}$ is $V_{offset}$.

Since the signal $\phi_{field}$ activates an entire row of cell circuits and $\phi_{amprst}$ activates an entire column, selective application of $\phi$field and $\phi_{amprst}$ along with $\phi_{DET}$ is effective to select the output of a specific cell.

After sampling all of the cells in the row and setting the associated cell circuit to the hold state, the switch 78 is opened and the operation is repeated for the next row.

After sampling the entire field (or 240 rows) of pixels, the pointer is returned to the top of the array in preparation for sampling the second field of pixels. As illustrated in FIG. 2C, during this state, a second field is sampled for each of the cells. The voltage at node 1 is sampled again onto the same plate of the first capacitor 80. However, as illustrated in the waveform of $\phi_{amprst}$ in FIG. 3, the amplifier 82 is enabled and the difference between the two fields ($V_1 = V_{field1} - V_{field2}$) is amplified by the ratio of the sampling capacitor to the feedback capacitor $C_s/C_f$. Because the sampling is performed on the same pixel, but at different fields, pixel to pixel non-uniformities due to DC offset biases and detector process imperfections are eliminated.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,
What is claimed is:

1. A circuit for processing a signal provided by a microbolometer unit cell comprising:

first means for selectively applying electrical energy to a first terminal of the unit cell to generate first and second signals at the first terminal thereof during first and second time intervals, said first means including a current source and a first switch for selectively connecting the current source to the first terminal of the unit cell;

second means for sampling the first signal during the first time interval and for sampling the second signal during the second time interval to provide first and second sampled signals respectively, said second means including a second switch having a first terminal connected to the first terminal of the unit cell; and third means for providing a third signal which is directly proportional to a difference between the first sampled signal and the second sampled signal, said third means including a capacitor having a first terminal connected to a second terminal of the second switch.

2. The invention of claim 1 further including fourth means for amplifying the difference between the first sampled signal and the second sampled signal.

3. The invention of claim 2 wherein the fourth means includes an amplifier, and wherein a second terminal of the capacitor is connected to a first input terminal of the amplifier.

4. The invention of claim 3 further including a third switch connected across an output terminal of the amplifier and the first input terminal thereof.

5. The invention of claim 4 further including a second capacitor connected across the output terminal of the amplifier and the first input terminal thereof.

6. The invention of claim 3 further including fifth means for selectively connecting a noise limiting element to the first terminal of the unit cell.

7. The invention of claim 6 wherein the third means includes a fourth switch for connecting a third capacitor to the first terminal of the unit cell.

8. The invention of claim 7 further including means for selectively controlling the first, second, and third switches to sample the signals at the first terminal of the unit cell during consecutive fields to create a field to field difference signal for amplification by the and amplifier.

9. A night vision camera comprising:

an array of microbolometer unit cells;

a plurality of unit cell signal processing circuits, one for each unit cell, each circuit including:

a current source, a first switch for coupling said current source to a first terminal of an associated unit cell to generate first and second signals at the first terminal thereof during first and second time intervals, sampling means for sampling the first signal during the first time interval and for sampling the second signal during the second time interval to provide first and second sampled signals respectively, said sampling means including a second switch having a first terminal connected to the first terminal of the unit cell, means providing a third signal which is directly proportional to a difference between the first sampled signal and the second sampled signal, said means including a capacitor having a first terminal connected to a second terminal of the second switch, and amplifying means for amplifying the difference between the first sampled signal and the second sampled signal; and means for displaying the amplified difference signals.

* * * * *